United States Patent
Zhang et al.

(10) Patent No.: US 9,872,307 B2
(45) Date of Patent: Jan. 16, 2018

(54) APPARATUS AND METHODS OF TIME DOMAIN MULTIPLEXING SOLUTIONS FOR IN-DEVICE COEXISTENCE

(75) Inventors: Yujian Zhang, Beijing (CN); Xiangying Yang, Portland, OR (US); Jing Zhu, Portland, OR (US); Xue Yang, Arcadia, CA (US); Emily Qi, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 957 days.

(21) Appl. No.: 13/077,745

(22) Filed: Mar. 31, 2011

(65) Prior Publication Data

US 2012/0082077 A1 Apr. 5, 2012

Related U.S. Application Data

(60) Provisional application No. 61/389,080, filed on Oct. 1, 2010.

(51) Int. Cl.
| | |
|---|---|
| *H04W 72/12* | (2009.01) |
| *H04J 3/02* | (2006.01) |
| *H04L 1/18* | (2006.01) |
| *H04L 5/14* | (2006.01) |
| *H04W 8/24* | (2009.01) |
| *H04W 76/04* | (2009.01) |
| *H04W 88/06* | (2009.01) |

(52) U.S. Cl.
CPC ........... *H04W 72/1215* (2013.01); *H04J 3/02* (2013.01); *H04L 1/1861* (2013.01); *H04L 5/14* (2013.01); *H04W 8/245* (2013.01); *H04W 76/048* (2013.01); *H04W 88/06* (2013.01)

(58) Field of Classification Search
USPC ........................ 370/311, 336–338; 455/426.1
See application file for complete search history.

(56) References Cited

U.S. PATENT DOCUMENTS

| | | | |
|---|---|---|---|
| 7,499,420 B2 | 3/2009 | Huh et al. | |
| 2008/0117891 A1* | 5/2008 | Damnjanovic | H04W 72/04 370/345 |
| 2008/0247367 A1* | 10/2008 | Guo et al. | 370/338 |
| 2009/0061849 A1* | 3/2009 | Yang et al. | 455/426.1 |
| 2009/0080401 A1 | 3/2009 | Zhu et al. | |
| 2009/0232054 A1 | 9/2009 | Wang et al. | |
| 2010/0031110 A1* | 2/2010 | Seok et al. | 714/748 |
| 2010/0056136 A1* | 3/2010 | Zhu | 455/426.1 |

(Continued)

FOREIGN PATENT DOCUMENTS

| | | | | |
|---|---|---|---|---|
| JP | WO 2009041547 A1 * | 4/2009 | ........ | H04W 56/0005 |
| TW | 200818826 | 4/2008 | | |
| WO | 2012/044902 A1 | 4/2012 | | |

OTHER PUBLICATIONS

3rd Generation Partnership Project; Technical Specification Group Services and System Aspects; Home enhanced Node B Operations, Administration, Maintenance, and Provisioning; 3GPP TS 32.592 version 10.0.0 (Jun. 2010).*

(Continued)

*Primary Examiner* — Benjamin Lamont

(57) ABSTRACT

Embodiments of systems and methods for time domain multiplexing solutions for in-device coexistence are generally described herein. Other embodiments may be described and claimed.

15 Claims, 5 Drawing Sheets

(56) References Cited

U.S. PATENT DOCUMENTS

| | | | |
|---|---|---|---|
| 2010/0061326 A1* | 3/2010 | Lee et al. ............... | 370/329 |
| 2010/0135256 A1 | 6/2010 | Lee et al. | |
| 2010/0220683 A1 | 9/2010 | Novak et al. | |
| 2010/0232308 A1* | 9/2010 | Yamazaki ......... | H04W 56/0005 370/252 |
| 2010/0290352 A1 | 11/2010 | Oyman et al. | |
| 2010/0322175 A1* | 12/2010 | Chen ............... | H04L 5/0007 370/329 |
| 2011/0242969 A1* | 10/2011 | Dayal et al. ............ | 370/225 |
| 2011/0243047 A1* | 10/2011 | Dayal et al. ............ | 370/311 |
| 2011/0312288 A1* | 12/2011 | Fu et al. ............... | 455/88 |
| 2012/0082140 A1* | 4/2012 | Lin et al. ............... | 370/336 |
| 2013/0114583 A1* | 5/2013 | Park ............... | H04W 52/0216 370/338 |

OTHER PUBLICATIONS

"3rd Generation Partnership Project; Technical Specification Group Radio Access Network; Evolved Universal Terrestrial Radio Access (E-UTRA); Study on signalling and procedure for interference avoidance for in-device coexistence", (Release 11), 3GPP TR 36.816, V11.0.0, Jun. 2011, pp. 1, 7-20.

International Search Report and Written Opinion received for PCT Patent Application No. PCT/US2011/054166, dated Mar. 13, 2012, 9 pages.

Media Tek, "Analysis in In-Device Coexistence Interference Avoidance", 3GPP TSG RAN WG2 #71, R2-104444, Aug. 23-27, 2010.

Intel Corporation (UK) Ltd., "Discussion on In-Device Coexistence scenarios and solutions", 3GPP TSG RAN WG2 #71, R2-104382, Aug. 23-27, 2010.

International Preliminary Report on Patentability for International Application No. PCT/US2011/054166, dated Apr. 11, 2013, 8 pages.

Office Action and Search Report received for Taiwanese Patent Application No. 103137639, dated Dec. 9, 2015, 19 pages including 8 pages English translation.

Office Action and Search Report received for Chinese Patent Application No. 201180058001.6, dated Mar. 11, 2015, 32 pages including 20 pages English translation.

Extended European Search Report received for European patent Application No. 118299516, dated Jan. 12, 2017, 10 pages.

* cited by examiner

APPARATUS AND METHODS OF TIME DOMAIN MULTIPLEXING SOLUTIONS FOR IN-DEVICE COEXISTENCE

REFERENCE TO RELATED INVENTIONS

The present non-provisional application claims priority to U.S. Provisional Patent Application No. 61/389,080 filed Oct. 1, 2010, entitled "Advanced Wireless Communication Systems and Techniques."

FIELD OF THE INVENTION

The present disclosure relates generally to the field of wireless communications and more particularly to methods and related systems for time domain multiplexing using a multi-communication platform.

BACKGROUND

As wireless communication becomes more and more popular at offices, homes, and schools, different wireless technologies and applications may work to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) can offer fast, short-distance connectivity within a relatively small space such as an office workspace or a room within a home. Wireless local area networks (WLANs) can provide broader range than WPANs within office buildings, homes, schools, etc. Wireless metropolitan area networks (WMANs) cover a greater distance than WLANs by connecting, for example, buildings to one another over a broader geographic area. Wireless wide area networks (WWANs) provide an even broader range and such networks are widely deployed in cellular infrastructure. Although each of the above-mentioned wireless communication networks may support different usages, simultaneous use of two or more of these technologies by a multi-communication (multi-com) platform or device can cause interference or collisions, resulting in impaired performance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
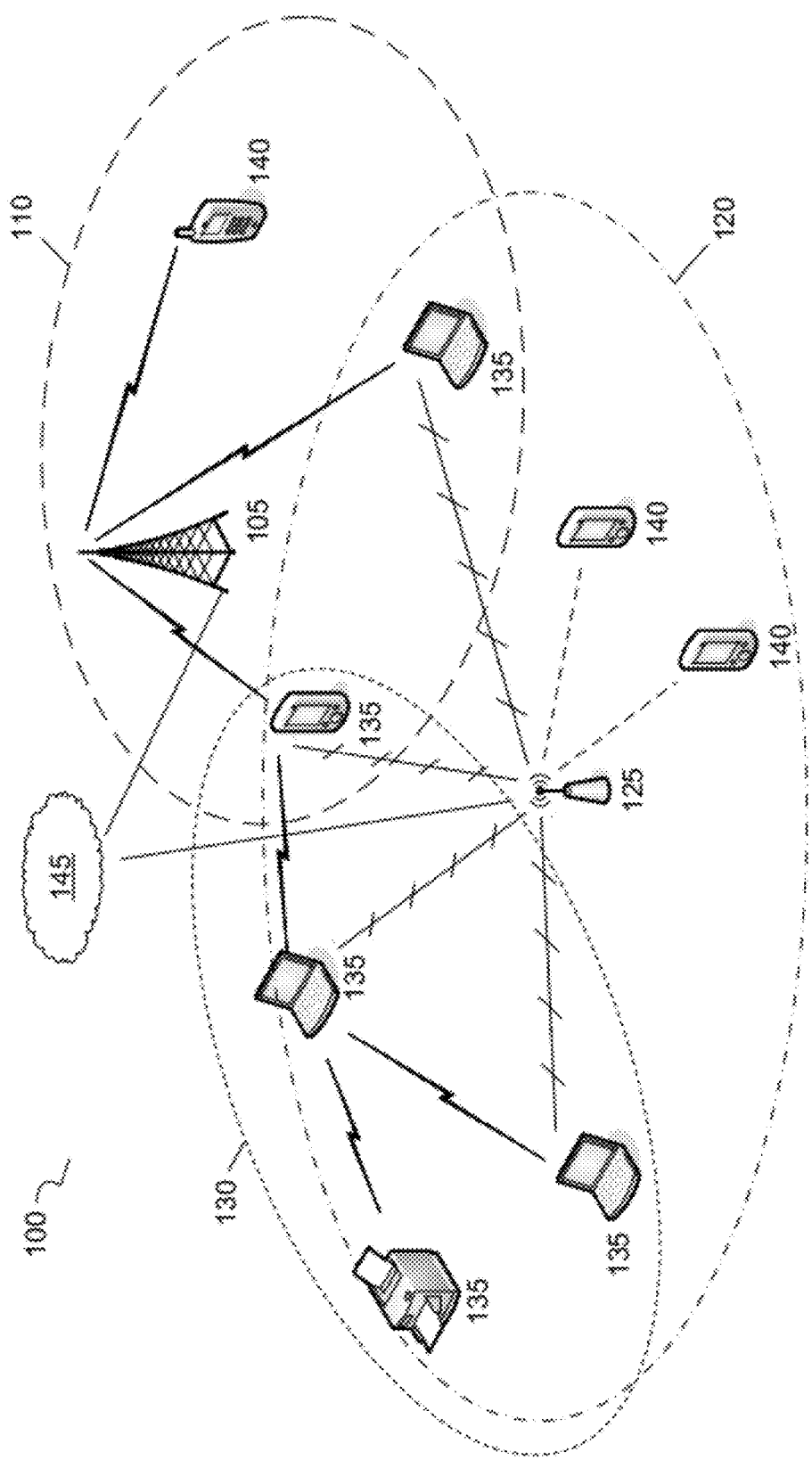
FIG. 1 illustrates heterogeneous overlapping wireless networks in accordance with some embodiments.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for providing multiplexing solutions for a multi-radio platform in a heterogeneous wireless network are set forth to provide a thorough understanding of embodiments of the invention. However, it will be understood by those skilled in the art that these embodiments may be practiced without these specific details. In other instances, well-known methods, procedures, components and circuits have not been described in detail so as not to obscure the embodiments.

It would be an advance in the art to provide a system and methods for coordination of a multi-radio platform to avoid interference in a heterogeneous wireless communication system wherein a plurality, i.e. more than one, of networks are deployed in the wireless communication system and the multi-radio platform is equipped with a plurality of radio transceivers, or collocated transceivers, to communicate over the plurality of networks. Multiple radio transceivers can be co-located in the same platform to allow the platform to access a number of radio technologies or protocols operating on various frequency bands, which may include adjacent or contiguous frequency bands, and prior solutions such as an application of filters may not provide sufficient rejection or selection of a target or desired frequency band. Resulting interference may impede the performance of the multi-radio platform or even prevent the multi-radio platform from operating in the heterogeneous wireless system. It would be helpful to provide methods and system to avoid signal interference for the multiple radios on the multi-radio platform, such as through time domain duplexing to allow for in-device coexistence.

Now turning to the figures, FIG. 1 illustrates a wireless communication system 100 in accordance with some embodiments of the invention. The wireless communication system 100 may include one or more wireless networks, generally shown as 110, 120, and 130. In particular, the wireless communication system 100 may include a WWAN 110, a WLAN 120, and a WPAN 130. Although FIG. 1 depicts three wireless networks, the wireless communication system 100 may include additional or fewer wireless communication networks including multiple overlapping networks of the same type. For example, the wireless communication system 100 may include one or more WMANs (not shown), additional WLANs, and/or WWANs. The methods and apparatus described herein are not limited in this regard.

The wireless communication system 100 also includes one or more platforms generally shown as multi-radio platforms 135 capable of accessing a plurality of wireless networks, and single-radio platforms 140 capable of accessing a single wireless network. For example, the platforms 135 and 140 may include wireless electronic devices such as a smartphone, a laptop computer, a handheld computer, a tablet computer, a cellular telephone, a mobile device, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts a number of platforms, the wireless communication system 100 may include more or less platforms 135 and 140.

Reference to a platform may be a user equipment (UE), subscriber station (SS), station (STA), mobile station (MS), advanced mobile station (AMS), high throughput (HT) station (STA), or very HT STA (VHT STA). The various forms of devices such as the platform, UE, SS, MS, HT STA, and VHT STA may be interchanged and reference to a particular device does not preclude other devices from being substituted in various embodiment(s). A platform may also be a base station (BS), access point (AP), node, node B, or evolved node B (eNode-B). Further, these terms may be conceptually interchanged, depending on which wireless protocol is being used in a particular wireless network, so a reference to BS herein may also be seen as a reference to either of ABS, eNode-B, or AP as one example.

The platforms 135 and 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), single carrier frequency division multiple access (SC-FDMA), multi-carrier modulation (MDM), and/or other suitable modulation techniques to communicate via wireless links.

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (Wi-MAX) Forum, Infrared Data Association (IrDA), Third Generation Partnership Project (3GPP), etc.). In some embodiments, communications may be in accordance with specific communication standards, such as the Institute of Electrical and Electronics Engineers (IEEE) standards including IEEE 802.15 (e.g. Bluetooth), IEEE 802.11(a), 802.11(b), 802.11(g), 802.11(h) and/or 802.11(n) standards (referenced herein as Wi-Fi) and/or proposed specifications for WLANs, although the scope of the invention is not limited in this respect as they may also be suitable to transmit and/or receive communications in accordance with other techniques and standards.

The platforms may operate in accordance with other wireless communication protocols to support the WWAN 110. In particular, these wireless communication protocols may be based on analog, digital, and/or dual-mode communication system technologies such as a Third Generation Partnership Project (3GPP), Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Long Term Evolution (LTE) standards based on these technologies, variations and evolutions of these standards, and/or other suitable wireless communication standards.

Figure 2:
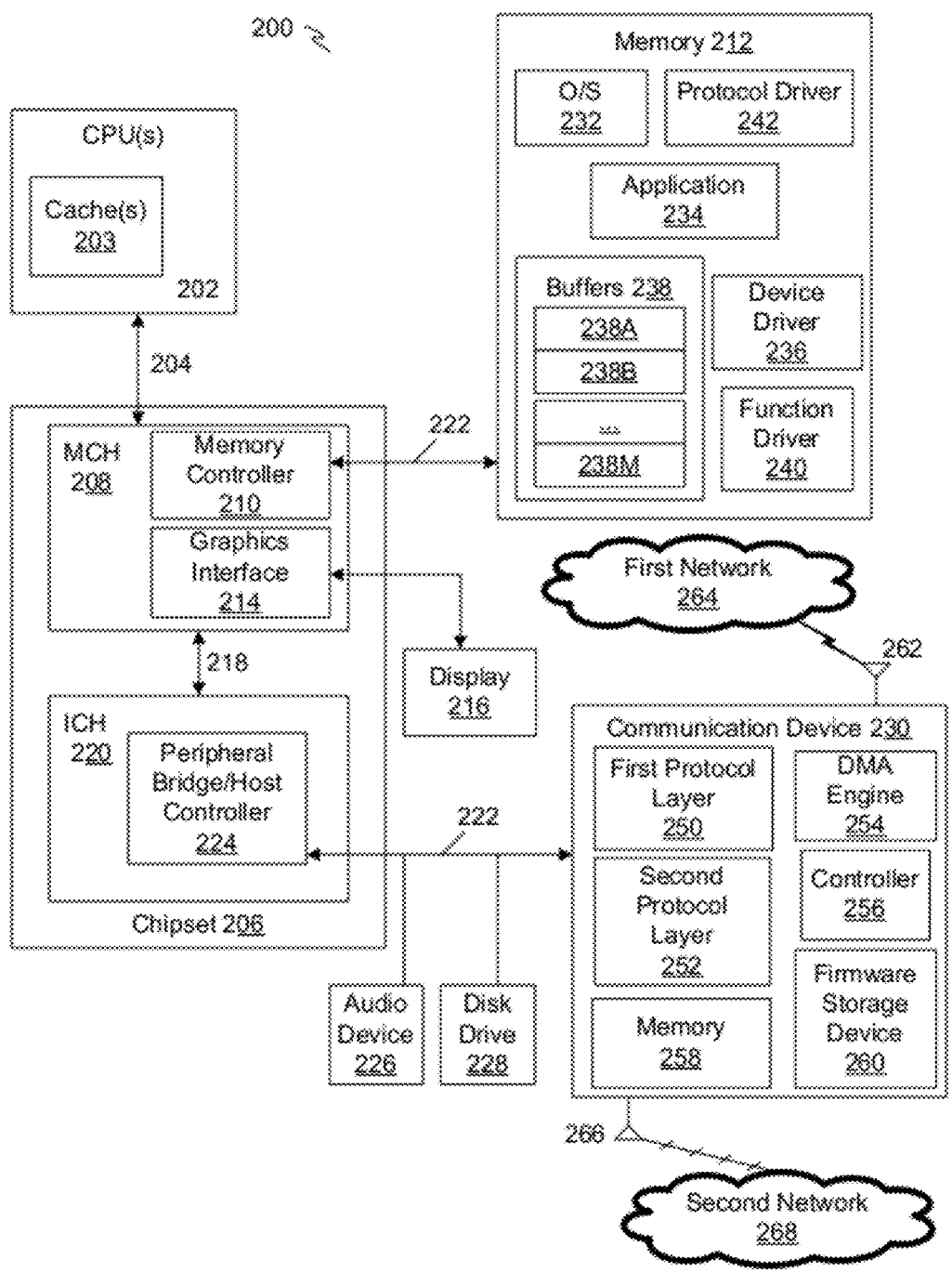
FIG. 2 illustrates a block diagram of a multi-com platform in accordance with various embodiments.

FIG. 2 illustrates a block diagram of a multiple communication (multi-com) platform 200, which may be the multi-radio platform 135 of FIG. 1, with multiple radios in accordance with various embodiments of the invention. The multi-com platform 200 may include one or more processors or central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network), etc. (including a reduced instruction set computer (RISC) processor or a complex instruction set computer (CISC)). Moreover, the processors 202 may have a single or multiple core design. The processors 202 with a multiple core design may integrate different types of processor cores, including graphics processing cores, on the same integrated circuit (IC) die. Also, the processors 202 with a multiple core design may be implemented as symmetrical or asymmetrical multiprocessors.

The processor 202 may include one or more caches 203, which may be private and/or shared in various embodiments. A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the multi-com platform 200. In various embodiments, the memory 212 may include one or more volatile storage or memory devices such as random access memory (RAM), dynamic RAM (DRAM), synchronous DRAM (SDRAM), static RAM (SRAM), etc. Nonvolatile memory may also be utilized such as phase change memory (PCM) or NAND and include a hard disk or solid state drive. Additional devices may be coupled to the interconnection network 204, such as multiple processors and/or multiple system memories.

The MCH 208 may further include a graphics interface 214 coupled to a display 216, which may be a passive or an interactive, e.g. various forms of a touch-screen, display. As shown in FIG. 2, a hub interface 218 may couple the MCH 208 to an input/output control hub (ICH) 220. The ICH 220 may provide an interface to input/output (I/O) devices coupled to the multi-com platform 200. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers.

Additionally, the multi-com platform 200 may include additional volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive or solid state drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the solid state drive 228 as part of memory management operations. The processor(s) 302 executes various commands and processes one or more packets 246 with one or more computing devices coupled a first network 264 and/or a second network 268 (such as the multi-radio platform 135 and/or single-radio platform 140 of FIG. 1).

As illustrated in FIG. 2, the communication device 230 includes a first network protocol layer 250 and a second network protocol layer 252 for implementing the physical (PHY) communication layer to send and receive network packets to and from an enhanced node B (eNode-B) 105, the access point 125, and/or other multi-com platform(s) 200 (e.g. multi-radio platform 135, single-radio platform 140). The communication device 230 may further include a direct memory access (DMA) engine 252, which may write packet data to buffers 238 to transmit and/or receive data. Additionally, the communication device 230 may include a controller 254, which may include logic, such as a programmable processor for example, to perform communication device related operations. In various embodiments, the controller 254 may be a MAC (media access control) component. The communication device 230 may further include a memory 256, such as any type of volatile/nonvolatile memory (e.g., including one or more cache(s) and/or other memory types discussed with reference to memory 212).

The communication device 230 in FIG. 2 is configured to communicate using radio or transceiving means to transmit and receive over each of two networks, such as the WWAN 110 and the WLAN 120 using a first radio 262 and second radio 266 in embodiments. In alternate embodiments, the communication device 230 may be configured with additional radios and protocol layers to operate over a WPAN 130 and/or a WMAN in addition to or in replacement of the WWAN 110 and/or the WLAN 120. For example, the multi-com platform 200 may be configured to operate over two or more LTE, WiMAX, Wi-Fi, Bluetooth, global navigation satellite system (GNSS), and/or industrial, scientific and medical (ISM) networks.

In an embodiment wherein the multi-com platform 200 operates over a WWAN 110 such as an LTE network and a WLAN 120 such as a Wi-Fi network, the multi-com platform 200 may apply a time division multiplexing scheme to ensure that transmission and/or reception of radio signals do not coincide with other radio signals transmitted or received by the multi-com platform 200.

For example, prior solutions such as a LTE discontinuous reception (DRX) mechanism provides time division multiplexing. If DRX is configured on the multi-com platform 200 and if a mode such as radio resource control (RRC) RRC_CONNECTED is enabled, the multi-com platform 200 can monitor a physical downlink control channel (PDCCH) discontinuously; otherwise the multi-com platform 200 can monitor the PDCCH continuously. RRC controls DRX operation by configuring parameters such as onDurationTimer, drx-InactivityTimer, longDRX-Cycle, drxStartOffset and optionally drxShortCycleTimer and shortDRX-Cycle. Further, when short DRX cycle is not configured, the multi-com platform 200 needs to monitor PDCCH at the beginning (in length of onDurationTimer) of the longDRX-Cycle.

The multi-com platform 200 stops monitoring PDCCH after onDurationTimer if all ongoing downlink (DL) and/or uplink (UL) transmissions can be finished. In the rest of DRX cycle, the multi-com platform 200 can become inactive, and an eNode-B 105 will not schedule any DL transmission or will not require the multi-com platform 200 to transmit any UL data. When shortDRX-Cycle is configured, the shortDRX-Cycle can be considered as a confirmation period in case a late packet arrives, before the multi-corn platform 200 enters the longDRX-Cycle. If data arrives at the eNode-B 105 while the multi-corn platform 200 is in the shortDRX-Cycle, the data is scheduled for transmission at the next wake-up time and the multi-corn platform 200 then resumes continuous reception. On the other hand, if no data arrives at the eNode-B 105 during the shortDRX-Cycle, the multi-corn platform 200 enters the longDRX-Cycle, assuming that the packet activity is finished for the time being. DRX Active Time is the duration when the multi-corn platform 200 monitors PDCCH within the DRX cycle.

In embodiments, a DRX cycle length may be enhanced by redefining units of time used in the cycle. Currently the DRX cycle length (longDRX-Cycle) is fixed and configured in units of subframes, wherein the length of 1 subframe is 1 milli-second (ms). However, the period of some radio technologies, e.g. Wi-Fi, is not a multiple of subframes. A typical beacon interval of Wi-Fi is 102.4 ms, which is over 100 time units or subframes, providing a period mismatch between the beacon interval used for Wi-Fi and an allotted number of time units provided in LTE in the longDRX-Cycle.

Due to the period mismatch, a position of Wi-Fi beacon drifts within a DRX cycle and will eventually collide with Active Time over a number of cycles. The DRX length may be enhanced in enhanced DRX by configuring the time units in common time units including fractions of milliseconds, such as a microsecond (1E-6 second) or in time unit granularity of other radio technologies (e.g. time unit for Wi-Fi) to avoid the period mismatch and provide a common unit of time in a cycle for multiple technologies. As another example, a Bluetooth period having a length of 3.75 ms may similarly benefit from a common time unit in a cycle, however the embodiment is not so limited.

Figure 3:
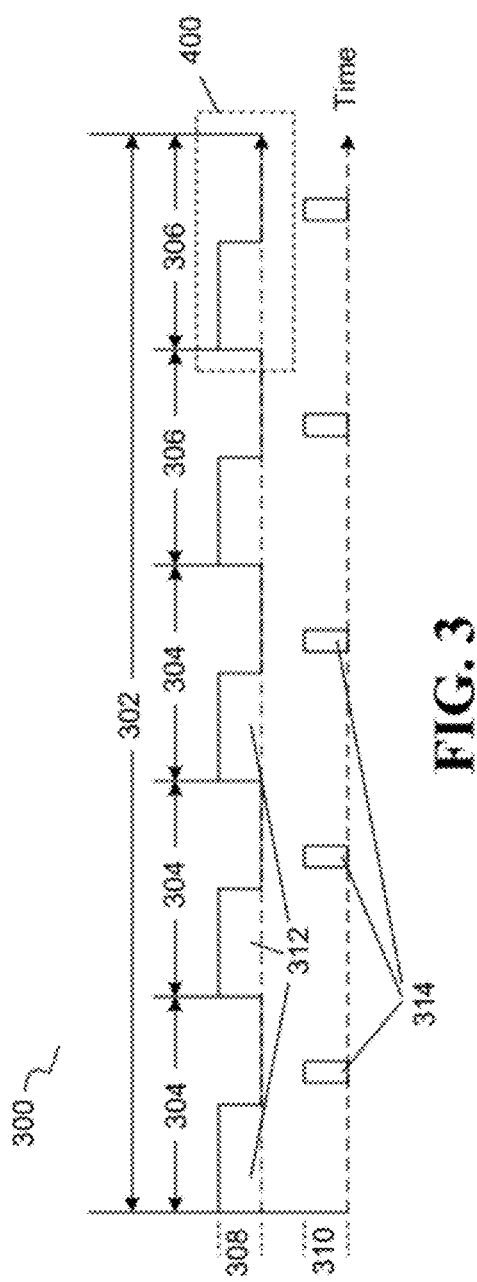
FIG. 3 is a diagram of a hybrid discontinuous reception (DRX) cycle in accordance with some embodiments.

In other embodiments, an aggregate cycle length comprising a plurality of cycles may be configured to account for a mismatch in a unit of time used by multiple technologies. FIG. 3 is a diagram of a hybrid discontinuous reception (DRX) cycle 300 wherein the cycle length over a number of cycles in a super cycle 302 is changed to emulate flexible DRX length units. The super cycle 302, which in embodiments may be a super DRX cycle having a duration of 512 ms, comprises a number of cycles such as a number of first cycles 304 and a number of second cycles 306. The first cycle 304 may be a type-A long DRX cycle with a duration of 102 ms and the second cycle 306 may be a type-B long DRX cycle with a duration of 103 ms, however the embodiment is not so limited. The first cycle 304 and the second cycle 306 may have shorter or longer durations in other embodiments depending on the types of wireless protocols used in the wireless communication system 100. FIG. 3 illustrates a first wireless protocol having a first activity 308 over a first active time 312 and a second wireless protocol having a second activity 310 over a second active time 314. Additional wireless protocols may be added in alternate embodiments. In an example, the first wireless protocol may be LTE and the second wireless protocol may be Wi-Fi wherein the second active time 314 is a beacon. Other wireless protocols may be substituted in other examples. For instance, the super cycle 302 may be any number of a plurality of cycles and/or the number of cycle lengths may vary in alternate embodiments.

In FIG. 3, a hybrid DRX cycle length is T ms, whose integer part is I ms and fraction part is F ms, wherein F is expressed in irreducible fraction as m/n. Then the super cycle 302 which may be a super DRX cycle, has n hybrid DRX cycles, consisting of n-m type-A DRX cycles and m type-B DRX cycles. The length of the first cycle, which may be a type-A DRX cycle, is I ms (subframe), and the length of the second cycle 306, which may be a type-B DRX cycle is I+1 ms (subframe). The super cycle 302 cycle has the length of nI+m, which is the multiple of T (which is I+m/n). In this way, the drifting problem can be solved by applying DRX granularity of subframes. For example, to emulate DRX length of 102.4 ms, a super cycle 302 consists of 3 first cycles 304 of length 102 ms, and 2 second cycles 306 of length 103 ms. In embodiments, it is not necessary that the emulated DRX length exactly match the period of other radio technologies. The emulated DRX length could be a multiple or a fraction of the period in consideration of other factors like latency.

In DRX operation, drxStartOffset is used to determine the offset of DRX cycle relative to Super Frame Number (SFN). SFN is indicated with 10 bits which means that its period is $2^{10}*10=10,240$ subframes. If a SFN period is not a multiple of super DRX cycle length, it is expected that after SFN wraps around to 0, the newly applied DRX cycle position might not be compatible with other radio technologies. To avoid this problem, either a rule is defined to automatically change drxStartOffset for each SFN period, or an eNode-B 105 can change related parameters via reconfiguration.

Figure 4:
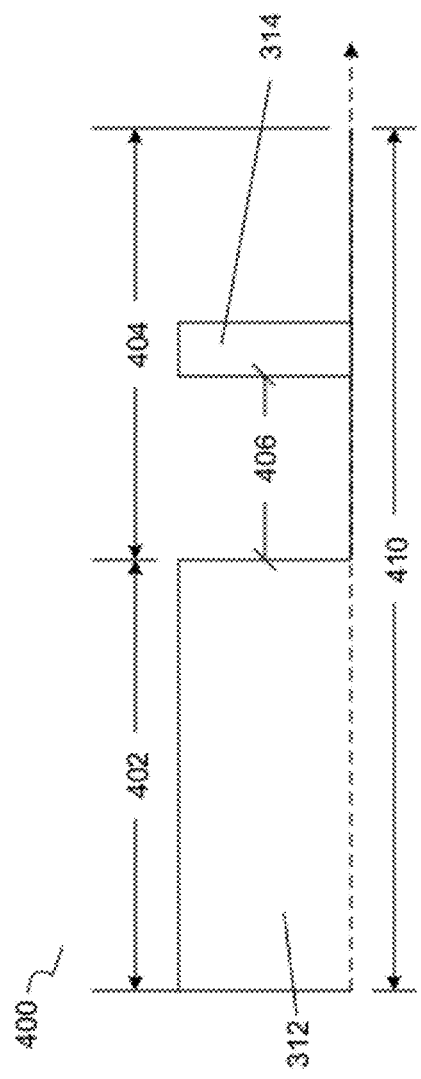
FIG. 4 is a diagram of enhanced DRX in accordance with some embodiments.

FIG. 4 is a diagram of enhanced discontinuous reception (DRX) 400 having an enhanced DRX cycle length 410 in accordance with some embodiments. The enhanced DRX 400 comprises a first duration 402 and a second duration 404, wherein the first duration 402 is an opportunity for activity, or an ON duration, for the first wireless protocol and the second duration 404 is an opportunity for activity by the second wireless protocol. As an example, an LTE radio may be active having a first active time 312 during the first duration 402 and a Wi-Fi beacon may be received or transmitted during the second active time 314 during the second duration 404.

A time difference 406 is defined in embodiments as a time duration or gap between the first active time 312 and the second active time 314. The time difference 406 could drift due to, for instance, timing inaccuracy of non-LTE radios. If the time difference 406 becomes quite large, the originally configured DRX parameters might not be appropriate since the second active 314 could intersect with a first active time 312 in a subsequent cycle.

The enhanced DRX 400 scheme or approach may include multiple signaling elements or parts. In a first part, the multi-com platform 200 or collocated radio, which may be a UE, determines and transmits information to a receiver in the network about the multi-com platform 200, referred to as setup information, wherein the receiver may be an eNode-B 105. The information provided to the receiver may include radio information for the in-device coexistence. In an example, the multi-com platform 200 informs the receiver that the multi-com platform contains a first radio 262 configured to operate over an LTE network and a second radio 266 configured to operate over a Wi-Fi or a Bluetooth network. The setup information may include additional networks if the multi-com platform 200 is configured to operate over additional and/or alternate networks.

The multi-com platform 200 may also transmit information providing particular parameters of the multi-com platform 200. For example, in an embodiment where the multi-com platform 200 operates over an LTE network and a Wi-Fi network, the multi-com platform 200 may send information about a Wi-Fi beacon interval and an operating mode of the multi-com platform 200 (e.g. whether the UE is working as an access point or a client station, whether the UE is in power saving mode, idle mode, and other relevant parameters). In another embodiment where Bluetooth is used, the information sent by the multi-com platform 200 includes Bluetooth operating mode information.

The multi-com platform 200 may further transmit information providing time difference between the radio technologies used by the multi-com platform 200. As an example, information regarding time difference between an LTE time reference (e.g. SFN) relative to a Wi-Fi beacon may be transmitted to the receiver. Also, information may be transmitted by the multi-com platform 200 to a receiver to describe a desired activity ratio and limits between radio technologies that the multi-com platform is configured to operate. The multi-com platform may directly recommend some DRX parameters (e.g. drxStartOffset and longDRX-Cycle) to the receiver in the network.

The enhanced DRX 400 scheme may include a second part, wherein the multi-com platform 200 receives configuration information from the receiver in the network for enhanced DRX. In embodiments, the receiver in the network may configure and activate an enhanced DRX scheme in response to the information provided by the multi-com platform 200. For example, the receiver, which may be an eNode-B 105, can configure a cycle (e.g. longDRX-Cycle) to match a Wi-Fi beacon interval, using hybrid DRX cycles as described in reference to FIG. 4 if necessary, and drxStartOffset or time difference 406 to place the Wi-Fi beacon in an appropriate position to avoid overlapping between Wi-Fi activity, such as the second active time 314, and LTE active time, such as the first active time 312.

The enhanced DRX 400 scheme may also include a third part, wherein according to a pattern established in the second part, the multi-com platform 200 operates the first radio 262, which may be configured for an LTE network, in the first duration 402 without using another radio such as the second radio 266, and uses the second radio 266, which may be configured for ISM/GNSS during the second duration 404 without using the first radio 262.

In embodiments, the multi-com platform 200 may provide measurement reports on in-device coexistence. The report content could be the time difference 406 and the report could be either periodic or event-triggered. If event-triggered, the measurement report can be triggered if the time difference drift exceeds a threshold. After an eNode-B 105 receives the measurement report, the eNode-B 105 may reconfigure DRX parameters to prevent the first active time 312 from intersecting with the second active time 314, or to provide a predetermined time difference 406 between the first active time 312 and the second active time 314.

Figure 5:
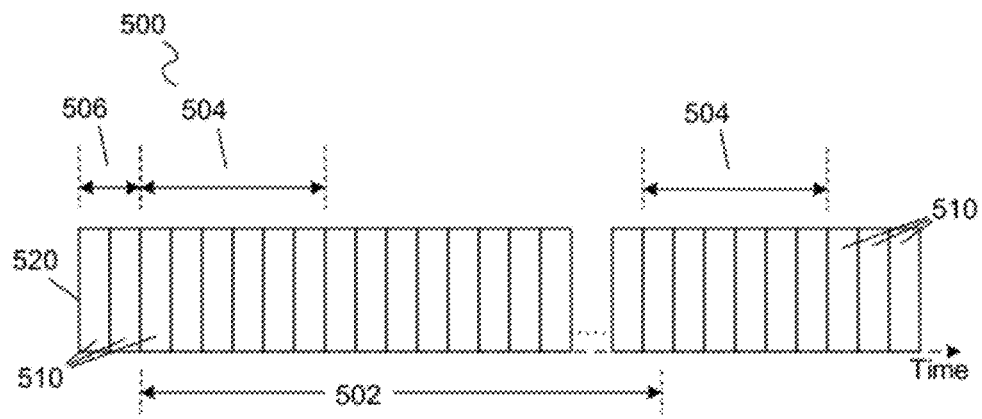
FIG. 5 is a diagram of a coexistence class in accordance with some embodiments.

FIG. 5 is a diagram of a first coexistence class 500 in accordance with some embodiments, wherein a time division multiplexing scheme is used to prevent or otherwise avoid coincidence or interference of signals being transmitted and/or received as observed by a transceiver such as the communication device 230 of the multi-com platform 200. The multi-com platform 200 may negotiate a periodic absence or a repeating period wherein no communications are sent to or from an eNode-B 105 to support concurrent operation of other radio(s) co-located on the same multi-com platform 200, e.g. ISM, GNSS, and Wi-Fi radios. A time pattern associated with the period absence is referred to herein as a coexistence class.

Figure 6:
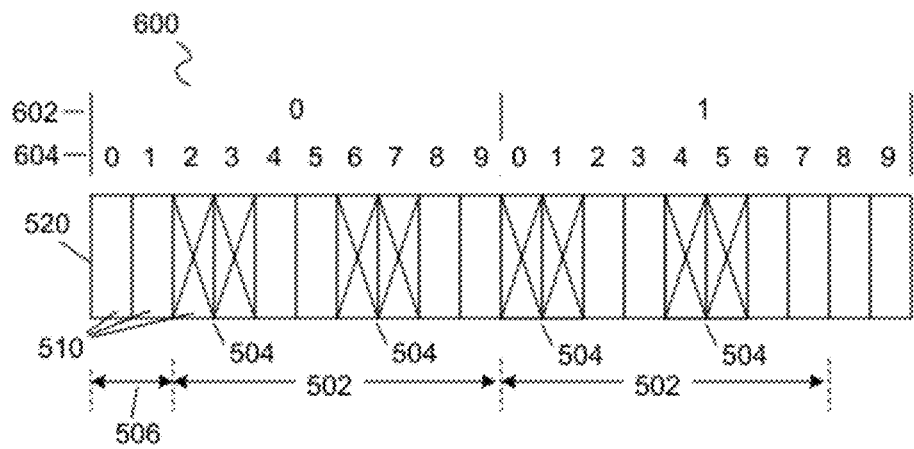
FIG. 6 is a diagram of a coexistence class in accordance with some embodiments.
Figure 7:
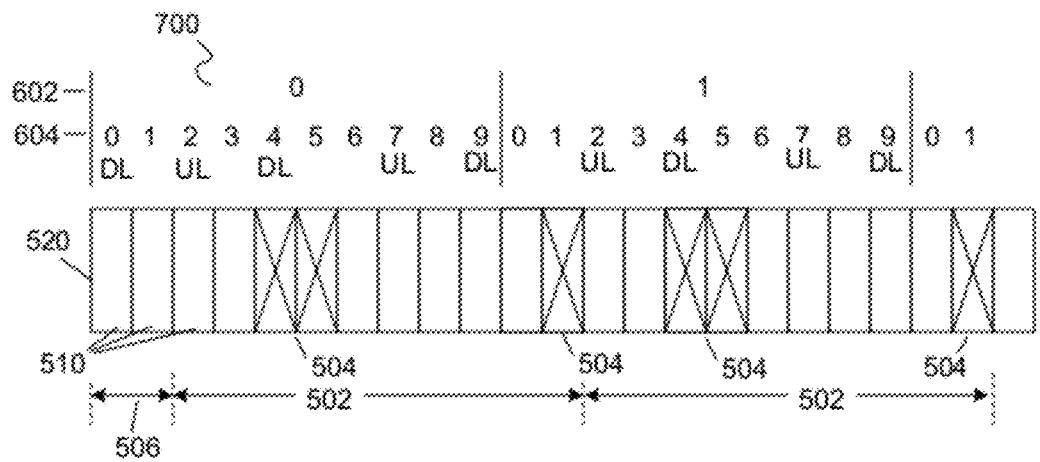
FIG. 7 is a diagram of a coexistence class in accordance with some embodiments.

Various types of coexistence class are illustrated and described in FIGS. 5, 6, and 7 and include parameters used to characterize aspects of each coexistence class. Reference to a coexistence active cycle is a time interval of an active pattern of a coexistence class, for example wherein a first radio 262 is active. One radio, such as the first radio 262 or the second radio 266 may be active for a particular wireless protocol, e.g. LTE or other wireless protocols described herein. A coexistence active interval is a time duration of a coexistence class designated for another radio in the multi-com platform 200, which may be the second radio 266 in an embodiment. The coexistence active interval provides a time duration when the second radio 266 can be active, thereby providing available resource for the second radio 266. A coexistence start offset is a start time of a coexistence active cycle. As discussed earlier, use of the terms first radio 262 and second radio 266 provides convenient reference to the multi-com platform 200 of FIG. 2 as used in FIGS. 3-9, however additional radios may also be co-located on the multi-com platform 200 and may be used in the embodiments described in FIGS. 3-9 in addition to the first radio 262 and the second radio 266.

Beginning with the first coexistence class 500 of FIG. 5, a coexistence active cycle 502 and coexistence active interval(s) 504 are defined in such a way that the coexistence active interval 504 is contiguous within the coexistence active cycle 502. A time unit of the coexistence active cycle 502 can be a microsecond, subframe 510 or frame in various embodiments. A time unit of the coexistence active interval 504 can be a subframe 510 or frame. Microsecond granularity for the coexistence active cycle 502 is beneficial for coexistence with radio technologies whose period is not a multiple of a subframe 510, such as an LTE subframe. For example, a Wi-Fi beacon interval is typically configured as 102.4 ms (100 Time Units).

In embodiments, coexistence between LTE over a first radio 262 and Wi-Fi over a second radio 266, the coexistence active cycle 502 can be configured as 102400 microseconds (µs). The first coexistence class 500, or Type I coexistence class as shown in FIG. 5, is 102400 µs in duration, includes a coexistence active interval 504 of 6 subframes, and a start offset 506 of 2 subframes (relative to SFN=0 520). During the coexistence active interval 504, the multi-com platform 200 can use the second radio 266 while the first radio 262 is inactive. As illustrated in FIG. 5, the coexistence active interval 504 is placed at the beginning of coexistence active cycle 502. However another implementation could place the coexistence active interval 504 at the end of the coexistence active cycle 502.

A second coexistence class 600 wherein the coexistence active cycle 502 and the coexistence active interval 504 are used in consideration of hybrid automatic repeat request (HARQ), is illustrated in FIGS. 6 and 7, in accordance with some embodiments. The embodiments of FIGS. 6 and 7 are illustrated in reference to an LTE network, however other network types may be used in alternate embodiments. For the second coexistence class 600, the coexistence active cycle and active interval are defined to allow for a subset of HARQ processes, e.g. LTE HARQ processes. The coexistence active cycle 502 may be defined as one HARQ period or multiple HARQ periods. The coexistence active interval 504 can be defined either in a continuous manner or in a bitmap manner.

In reference to frequency division duplexing (FDD) embodiments illustrated in FIG. 6, the coexistence active cycle 502 is 8 subframes 510 in length while the coexistence active interval 504 comprises 4 subframes 510. The coexistence active cycle 502 may comprise more or fewer subframes in length in alternate embodiments. A coexistence active interval 504 as illustrated in FIG. 6 can be indicated as bitmap "11001100" while "1" indicates the corresponding subframe 510 belongs to the 504 coexistence active interval while "0" indicates that the corresponding subframes 510 do not belong to the coexistence active interval 504. During the rest of the coexistence active cycle 502, four HARQ processes may operate within the coexistence active cycle. In embodiments where downlink (DL) HARQ is used, if DL data is transmitted in SFN#0, subframe#4, corresponding ACK/NACK can be transmitted in SFN#0, subframe #8, and DL retransmissions can be transmitted in SFN#1, subframe #2.

FIG. 7 is a diagram of the second coexistence class 700 using time division duplexing (TDD), in accordance with some embodiments. As shown in FIG. 7, which may be applicable to wireless protocols such as LTE, UL/DL configuration for TDD is 1. The coexistence active cycle 502 is 10 subframes 510 while the coexistence active interval 504 consists of 4 subframes 510. The coexistence active interval 504 can be indicated as bitmap "0011000001" wherein "1" indicates that the corresponding subframe 510 belongs to the coexistence active interval 504 while "0" indicates that the corresponding subframes 510 do not belong to the coexistence active interval 504. In embodiments using DL HARQ, if DL data is transmitted in SFN 602 #0, subframe 510 #6, corresponding ACK/NACK can be transmitted in SFN 602 #1, subframe 510 #2, and DL retransmissions can be transmitted in SFN 602 #1, subframe 510 #6.

In a third coexistence class (not shown), the coexistence active cycle 502 is not applicable given that the coexistence activity is not periodic. Only the coexistence active interval 504 and the 506 coexistence start offset are used in the third type of coexistence class. For example, once configured, in a multi-com platform 200 having an LTE radio and a non-LTE radio, the multi-com platform 200 will perform non-LTE radio activity during the coexistence active interval 504, and a starting point is given by the coexistence start offset 506. The third coexistence class is usually applicable for non-LTE activities that last for a long time, e.g. seconds. Wireless protocols with activities that last a long time such as GNSS radio are suitable for the third coexistence class.

As recited earlier in reference to embodiments for an enhanced DRX cycle, the in-device coexistence as illustrated in reference to FIGS. 5-7 may also include multiple signaling elements or parts. In the first part, the multi-com platform 200 or collocated radio, which may be a UE, provides or transmits setup information to a receiver in the network about the multi-com platform 200, wherein the receiver may be an eNode-B 105. The setup information provided to the receiver may include radio information for the in-device coexistence. The multi-com platform 200 may also transmit information providing particular parameters of the multi-com platform 200. The multi-com platform 200 may further transmit information providing time difference between the radio technologies used by the multi-com platform 200. Also, information may be transmitted by the multi-com platform 200 to a receiver to describe a desired activity ratio and limits between radio technologies that the multi-com platform is configured to operate. The multi-com platform 200 may also recommend some coexistence class parameters (e.g. coexistence class, coexistence active cycle 502, coexistence active interval 504, and coexistence start offset 506) to a receiver in the network.

The coexistence scheme can include a second part, wherein the multi-com platform 200 receives configuration information from the receiver in the network for in-device coexistence. In embodiments, the receiver in the network may transmit configuration information to the multi-com platform including coexistence class, coexistence active cycle 502, coexistence active interval 504, and coexistence start offset 506 information.

The coexistence scheme can also include a third part, wherein according to configured parameters received in the second part, the multi-com platform 200 operates the first radio 262, which may be configured for an ISM/GNSS network as an example, during the coexistence active interval 504 and operating the second radio 266, which may be configured for an LTE network as an example, in all or part of the rest of the coexistence active cycle 502 without using the first radio 262. In an embodiment using the third coexistence class, the multi-com platform 200 uses the first radio 262 configured for the ISM/GNSS network in the coexistence active interval 504, and resumes activity required by a second network such as LTE following the coexistence active interval 504. Alternate network protocols may be used in other embodiments.

A time difference between the active times of the first radio 262 and the second radio 266 may also occur in the coexistence class embodiments of FIGS. 5-7. The time difference could drift due to, for instance, timing inaccuracy of non-LTE radios. If the time difference becomes quite large, the originally configured coexistence class parameters might not be appropriate. As an example, a Wi-Fi beacon position within a coexistence active cycle 502 might drift to such an extent that the Wi-Fi beacon collides with activity of another radio of the multi-com platform 200. In embodiments, the multi-com platform 200 may provide measurement reports on in-device coexistence. The report content could be the time difference between the first radio 262 and the second radio 266 and the report could be either periodic or event-triggered. If event-triggered, the measurement report can be triggered if the time difference drift exceeds a threshold. After a receiver such as an eNode-B 105 receives the measurement report, the eNode-B 105 may reconfigure coexistence class parameters to prevent collisions between radios of the multi-com platform 200.

Figure 8:
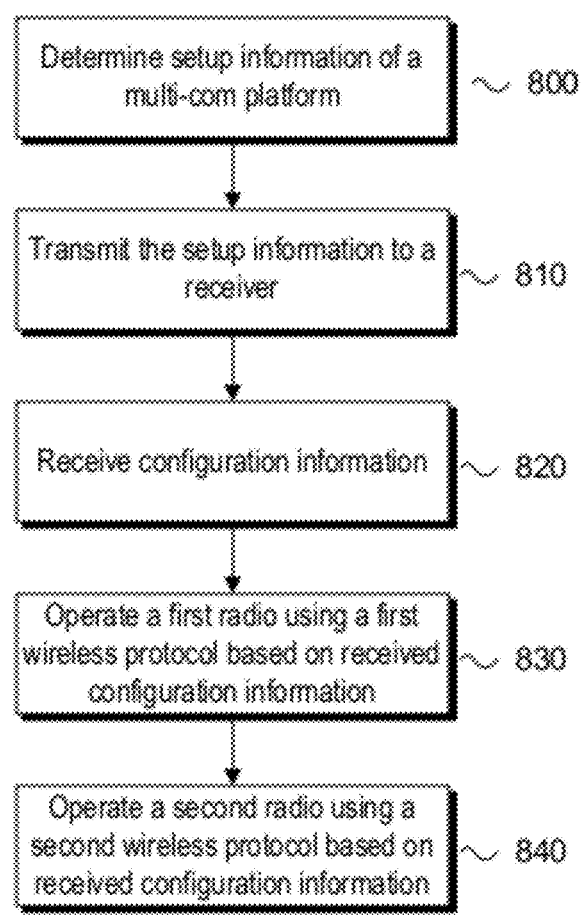
FIG. 8 is a flowchart that describes an embodiment of a method for in-device coexistence in accordance with some embodiments.

FIG. 8 is a flowchart that describes a method for time domain multiplexing for in-device coexistence, in accordance with embodiments described earlier in reference to FIG. 1 through FIG. 7. In element 800, setup information of a multi-corn platform 200 is determined. The setup information may include identification of a plurality of radios and network protocols the plurality of radios is configured to communicate over, wherein each radio of the plurality of radios may be configured to communicate over a separate network protocol. In element 810, the setup information is transmitted to a receiver, such as an eNode-B 105.

In element 820, configuration information is received from a receiver. In some embodiments, the configuration information comprises enhanced DRX parameters to allow the multi-corn platform to operate a first radio 262 during a first duration 402 and to operate a second radio 266 during a second duration 404. In other embodiments, the configuration information comprises coexistence class parameters to allow the multi-corn platform 200 to transmit from the second radio 266 during a coexistence active interval 504 and to transmit from the first radio 262 during a coexistence active cycle 502 other than during the coexistence active interval 504, or during the rest of the coexistence active cycle 502.

In element 830, the first radio 262 of the plurality of radios is operated using a first wireless protocol based at least in-part on the received configuration information. In element 840, a second radio 266 of the plurality of radios is operated using a second wireless protocol based at least in-part on the received configuration information.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit.

Embodiments of the invention may include sets of instructions executed on some form of processing core or otherwise implemented or realized upon or within a machine-readable medium. A machine-readable medium includes any mechanism for storing or transmitting information in a tangible form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for wireless communications, comprising:
   determining setup information of a user equipment (UE), wherein the setup information includes identification of a plurality of radios including a first radio and a second radio;
   detecting in-device coexistence interference by the (UE), wherein the UE is configured to communicate by a first radio according to a long term evolution (LTE) protocol and communicate by a second radio according to a wireless fidelity (Wi-Fi) protocol;
   transmitting in-device coexistence interference information to a receiver to suggest a first time-division multiplexing (TDM) pattern, wherein the in-device coexistence interference information indicates a subset of allowed hybrid automatic repeat request (HARQ) processes; and
   receiving, by the UE, a discontinuous reception (DRX) configuration to monitor a physical downlink control channel (PDCCH) discontinuously, wherein the DRX configuration comprises a second TDM pattern to operate the first radio during a first duration and to provide an opportunity to operate the second radio during a second duration, wherein the DRX configuration provides a DRX timing granularity of one microsecond, wherein the DRX configuration designates a DRX cycle length matching a beacon interval length of a Wi-Fi network.

2. The method of claim 1, further comprising using a bitmap to indicate the subset of HARQ.

3. The method of claim 2, wherein the in-device coexistence interference information comprises cycle length, offset and active time information.

4. The method of claim 3, further comprising transmitting, from the UE, a time offset between the LTE protocol and the Wi-Fi protocol.

5. The method of claim 1, wherein the first TDM pattern is the same as the second TDM pattern.

6. A user equipment (UE) for wireless communications, comprising:
   a processor;
   a memory;
   one or more antennas;
   a first radio to operate according to a long term evolution (LTE) protocol; and
   a second radio to operate according to a wireless fidelity (Wi-Fi) protocol;
      the first radio to transmit in-device coexistence interference information to a receiver, wherein the in-device coexistence interference information is provided using a bitmap to allow a subset of hybrid automatic repeat request (HARQ) requests; and
      the first radio to receive a discontinuous reception (DRX) configuration signal, wherein the DRX configuration comprises a second TDM pattern to operate the first radio during a first duration and to provide an opportunity to operate the second radio during a second duration, and wherein the first duration is provided to transmit LTE information, wherein the DRX configuration provides a DRX timing granularity of one microsecond, wherein the DRX configuration designates a DRX cycle length matching a beacon interval length of a Wi-Fi network.

7. The UE of claim 6, wherein the in-device coexistence interference information indicates a first TDM pattern comprising coexistence active cycle, coexistence active interval, and coexistence start offset information.

8. The UE of claim 6, further comprising a display.

9. The UE of claim 6, wherein the DRX configuration provides information for the communication device to discontinuously monitor a physical downlink control channel (PDCCH).

10. An apparatus comprising:
    a transceiver; and
    a processor to provide a time-division multiplexing (TDM) pattern to a user equipment (UE) comprising a first radio and a second radio, the transceiver to receive in-device coexistence interference information comprising discontinuous reception (DRX) cycle length information from the UE wherein the in-device coexistence interference information comprises a bitmap to indicate an allowed subset of hybrid automatic repeat request (HARQ) processes, and to transmit a DRX configuration comprising a second TDM pattern to operate the first radio during a first duration according to a long term evolution (LTE) protocol and to provide an opportunity to operate the second radio during a second duration according to a wireless fidelity (Wi-Fi) protocol, wherein the first duration and the second duration are determined by the processor, wherein the DRX configuration provides a DRX timing granularity of one microsecond, wherein the DRX configuration designates a DRX cycle length matching a beacon interval length of a Wi-Fi network.

11. The apparatus of claim 10, wherein the apparatus is part of a base station further comprising antennas and a memory.

12. The apparatus of claim 10, wherein the in-device coexistence interference information signals a first TDM pattern.

13. A non-transitory machine-readable medium having instructions stored thereon which when executed by a processor result in the following operations, comprising:
    receiving in-device coexistence interference information from a platform, wherein the platform is configured to communicate by a first radio according to a long term evolution (LTE) protocol and communicate by a second radio according to a wireless fidelity (Wi-Fi) protocol, the in-device coexistence interference information comprising a bitmap to indicate an allowed subset of hybrid automatic repeat request (HARD) processes; and
    transmitting a discontinuous reception (DRX) configuration to the platform, wherein the DRX configuration comprises a time-domain multiplexing (TDM) pattern to operate the first radio during a scheduled duration and to provide an opportunity to operate the second radio during another duration, and wherein the second TDM pattern provides a time offset between the LTE protocol and the Wi-Fi protocol, wherein the DRX configuration provides a DRX timing granularity of one microsecond, wherein the DRX configuration designates a DRX cycle length matching a beacon interval length of a Wi-Fi network.

14. The machine-readable medium of claim 13, wherein the time offset is equal to zero.

15. The machine-readable medium of claim 13, wherein the platform is further configured to transmit a number of coexistence class parameters.

* * * * *